United States Patent
Buldas et al.

(10) Patent No.: US 11,057,187 B2
(45) Date of Patent: Jul. 6, 2021

(54) BLOCKCHAIN-ASSISTED HASH-BASED DATA SIGNATURE SYSTEM AND METHOD

(71) Applicant: Guardtime SA, Lausanne (CH)

(72) Inventors: Ahto Buldas, Tallinn (EE); Risto Laanoja, Tallinn (EE); Ahto Truu, Tartu (EE)

(73) Assignee: Guardtime SA, Lausanne (CH)

( * ) Notice: Subject to any disclaimer, the term of this patent is extended or adjusted under 35 U.S.C. 154(b) by 225 days.

(21) Appl. No.: 16/531,068

(22) Filed: Aug. 4, 2019

(65) Prior Publication Data
US 2020/0052886 A1 Feb. 13, 2020

Related U.S. Application Data

(60) Provisional application No. 62/716,980, filed on Aug. 9, 2018.

(51) Int. Cl.
*H04L 29/06* (2006.01)
*H04L 9/06* (2006.01)
*H04L 9/08* (2006.01)
*H04L 9/32* (2006.01)

(52) U.S. Cl.
CPC .......... *H04L 9/0637* (2013.01); *H04L 9/0643* (2013.01); *H04L 9/0869* (2013.01); *H04L 9/3247* (2013.01)

(58) Field of Classification Search
CPC ... H04L 9/0637; H04L 9/0643; H04L 9/0869; H04L 9/3247; H04L 2209/38; H04L 9/3239
See application file for complete search history.

(56) References Cited

U.S. PATENT DOCUMENTS

| | | | | |
|---|---|---|---|---|
| 10,454,674 B1* | 10/2019 | Bar-El | ................. | H04L 9/0637 |
| 2002/0016913 A1* | 2/2002 | Wheeler | ............. | G06Q 50/188 |
| | | | | 713/170 |
| 2004/0260740 A1* | 12/2004 | Liu | ........................ | H04L 9/0643 |
| | | | | 708/490 |
| 2005/0132194 A1* | 6/2005 | Ward | .................... | G07C 9/257 |
| | | | | 713/176 |
| 2015/0039893 A1* | 2/2015 | Buldas | ................. | H04L 9/3247 |
| | | | | 713/176 |
| 2015/0063568 A1* | 3/2015 | Singhal | ................ | H04L 63/068 |
| | | | | 380/270 |
| 2016/0019733 A1* | 1/2016 | Robinton | .............. | H04W 4/023 |
| | | | | 340/5.61 |
| 2017/0033932 A1* | 2/2017 | Truu | ..................... | H04L 9/3239 |
| 2017/0078101 A1* | 3/2017 | Maximov | ............ | H04L 9/3242 |
| 2018/0183602 A1* | 6/2018 | Campagna | ........... | H04L 9/0861 |

* cited by examiner

*Primary Examiner* — Sher A Khan
(74) *Attorney, Agent, or Firm* — Jeffrey Pearce

(57) ABSTRACT

A set of secret, indexed keys is generated and used in requests from a signing entity to a signing server for digital signature of messages. The signing server maintains a counter as well as a hash tree that aggregates requests during a round into a root value that is stored in an append-only data structure in a repository. Each signing entity is associated with a leaf of the hash tree. After a signature is formed, the counter for the requesting signing entity is incremented, whereby the secret key that was used cannot be used again.

7 Claims, 2 Drawing Sheets

BLOCKCHAIN-ASSISTED HASH-BASED DATA SIGNATURE SYSTEM AND METHOD

CROSS-REFERENCE TO RELATED APPLICATIONS

This application claims priority of U.S. Provisional Patent Application No. 62/716,980, filed 9 Aug. 2018.

FIELD OF THE INVENTION

This invention relates to data security.

BACKGROUND

Many different forms of server-based signatures exist. For example, Lamport signatures are server-based, as are the so-called on-line/offline signatures first proposed in 1989 by Even, Goldreich and Micali in order to speed up the signature creation procedure, which is usually much more time-consuming than verification. The so-called Server-Supported Signatures (SSS) proposed in 1996 by Asokan, Tsudik and Waidner delegate the use of time-consuming operations of asymmetric cryptography from clients (ordinary users) to a server. Clients use hash chain authentication to send their messages to a signature server in an authenticated way and the server then creates a digital signature by using an ordinary public-key digital signature scheme. In SSS, signature servers are not assumed to be Trusted Third Parties (TTPs) because the transcript of the hash chain authentication phase can be used as evidence. In SSS, servers cannot create signatures in the name of their clients.

The so-called Delegate Servers (DS) proposed in 2002 by Perrin, Burns, Moreh and Olkin reduce the problems and costs related to individual private keys. In their solution, clients (ordinary users) delegate their private cryptographic operations to a Delegation Server (DS). Users authenticate to the DS and request to sign messages on their behalf by using the server's own private key. The main motivation behind DS was that private keys are difficult for ordinary users to use and easy for attackers to abuse. Private keys are not memorable like passwords or derivable from persons like biometrics, and cannot be entered from keyboards like passwords. Private keys are mostly stored as files in computers or on smartcards, which may be stolen.

The main drawback in prior art server-based signature solutions is that the server must be completely trusted. Still, it is somewhat unclear whether such a server-based signature system is less trustworthy than the traditional PKI based signature solutions, where the signature keys are held by end-users. Moreover, the electronic devices needed for creating electronic signatures are far more complicated than pens used to sign paper documents. Having full control over the electronic signature technology is out of question for most users. Therefore, blind trust is inevitable in the electronic signature systems and it does not make much difference whether to trust one's personal computer or a signature server. Considering the limited knowledge average persons have about elementary security procedures, server-based solutions are therefore typically preferable to the traditional ones.

The issue of trust is mitigated by server-supported signature schemes, where a signature is created in collaboration with both server and client, so that neither of the parties alone can create signatures. As example of such a scheme is "multi-prime RSA", where private key components are shared between a signer and a server. Server-supported signature schemes can realize several advantages:

a. Complete server-side logging of signing operations, so that in case of actual or suspected key leak the number of forged signatures is logged, making damage control and forensics manageable;

b. After key revocation, no signing is possible; thus, no new signatures can be created after the revocation, making key life-cycle controls much simpler;

c. The server can add custom attributes, and even trusted attributes which cannot be forged by the server itself; for example, a cryptographic time-stamp, address, policy ID, etc.

d. The server can perform necessary checks before participating in signing, for example, by performing a transaction validity check. Note that signed data does not have to be revealed to the server in normal cases.

Other known signature schemes are based on hash functions. The earliest digital signature scheme constructed from hash functions is due to Lamport. Merkle introduced two methods for reducing the key sizes, one of which was proposed to him by Winternitz. The Winternitz scheme has subsequently been more thoroughly analyzed and further refined by Even, et al., Dods et al., Buchmann et al., and Hülsing. All of these schemes are one-time, and require generation of a new key pair and distribution of a new public key for each message to be signed.

An important contribution by Merkle was the concept of a hash tree, which enables a large number of public keys to be represented by a single hash value. With the hash value published, any one of the N public keys can be shown to belong to the tree with a proof consisting of $\log_2 N$ hash values, thus aggregating, that is, combining, N instances of a one-time scheme into an N-time scheme. Buldas and Saarepera, and Coronado Garcia, showed the aggregation to be secure if the hash function used to build the tree is collision-resistant. Rohatgi also used the XOR-tree construct proposed by Bellare and Rogaway to create a variant of a hash tree whose security is based on second pre-image resistance of the hash function instead of collision resistance. Dahmen, et al., proposed a similar idea with a more complete security proof.

A drawback of the above prior art hash tree constructs is that the whole tree has to be built at once, which also means all the private keys have to be generated at once. Merkle proposed a certification tree that allows just the root node of the tree to be populated initially and the rest of the tree to be grown gradually as needed. However, to authenticate the lower nodes of the tree, a complete chain of one-time signatures (as opposed to a chain of only sibling hash values) is needed, unless the protocol is used in an interactive environment where the recipient keeps the public keys already delivered as part of earlier signatures. Malkin, et al., and Buchmann, et al., proposed various multi-level schemes where the keys authenticated by higher-level trees are used to sign roots of lower-level trees to enable the key sets to be expanded incrementally.

Buchmann, et al., proposed XMSS, a version of the Merkle signature scheme with improved efficiency compared to previous ones. Hülsing, et al. introduced a multi-tree version of it. Hülsing, et al., described a modification that is hardened against so-called multi-target attacks, where the adversary will succeed when it can find a pre-image for just one of a large number of target output values of a hash function.

A risk with the N-time schemes is that they are stateful: as each of the one-time keys may be used only once, the signer will need to keep track of which keys have already been used. If this state information is lost (for example, when a previous state is restored from a backup), keys may be re-used by accident.

Perrig proposed BiBa, which has small signatures and fast verification, but rather large public keys and slow signing. Reyzin and Reyzin proposed the HORS scheme that provides much faster signing than BiBa. These two are not strictly one-time, but so-called few-time schemes, where a private key can be used to sign several messages, but the security level decreases with each additional use. Bernstein, et al., proposed SPHINCS, which combines HORS with XMSS trees to create a stateless scheme that uses keys based on a pseudo-random schedule that makes the risk of re-use negligible even without tracking the state.

Interactive signature protocols, based on interaction either between parties or with an external time-stamping service, are also known. For example, using the "Guy Fawkes Protocol", once bootstrapped, a message is preceded by publishing the hash of the message, and each message is authenticated by accompanying it with a secret whose hash was published together with an earlier message. A broadcast commitment step is thereby critical for providing non-repudiation of origin. Although the verification is limited to a single party, the protocol may be considered a signature scheme according to some definitions.

A similar concept in the context of authentication was first used in the so-called TESLA protocol. TESLA was designed to authenticate parties who are constantly communicating with each other; thus, it has the same inflexibility as the Guy Fawkes protocol of not supporting multiple independent verifiers.

An authenticated data structure is a data structure whose operations can be performed by an untrusted prover (for example, server) and the integrity of results can be verified efficiently by a verifier. Authenticated data structures were first proposed for checking the correctness of computer memory. Crosby and Wallach, for example, analyzed applications in the context of tamper-evident logging. The concept found a practical use in PKI certificate management, first proposed as "undeniable attesters" by Buldas, et al., where PKI users receive attestations of their certificates' inclusion or removal from a valid certificate database, and the practical "certificate transparency" framework, which facilitates public auditing of certification authority operations.

"Blockchain"

Although the term "blockchain" itself, as well as related terms, do not yet have universally accepted definitions, typically a "blockchain" is understood as being a data structure comprising a series of usually (but not necessarily) cryptographically linked, time-stamped blocks, where each block includes data corresponding to one or more transactions, hashed together with linking data, such as the hash of some data and/or metadata of at least one preceding block. The blockchain can then be used to create a ledger, which is typically an append-only database.

Some blockchain variants involve distribution and consensus, that is, copies of the blockchain are distributed to several entities, which then follow a procedure to "agree" on what data is to be allowed to constitute the next block. Many of the blockchains used for cryptocurrencies follow this model, for example, since they, usually by design philosophy, wish to avoid any central authority. In other configurations, a single entity may control access to a proprietary blockchain according to its own rules; governments, banks, enterprises, etc., will, for example, usually not want the operation of their blockchains to depend on consensus among distributed, often anonymous outside entities. In either case, once data is entered into a block of the chain, the entry is essentially irrefutable, that is, non-repudiatable, since any tampering with the data would be reflected in the chained hash calculations and thus easily detected.

One current point of dispute when it comes to the concept of a "blockchain" is whether, by definition, any entity may be allowed to submit blocks to and verify blocks in the blockchain, possibly only upon meeting some proof-of-work (such as Bitcoin's "mining"), or proof-of-stake requirement, or whether the entities that may submit to and verify blocks in the data structure must be permissioned by some central authority. Thus, a "blockchain" may be "open" or not.

BRIEF DESCRIPTION OF THE DRAWINGS

FIG. 5 shows one example of a verification routine.

DETAILED DESCRIPTION

Embodiments of this invention provide a new method, and corresponding system implementation, that is practical, provides forward security, non-repudiation of the origin via efficient revocation, is resistant to known attacks even by efficient quantum computers, and provides "built in" cryptographic time-stamping. The sizes of the signature and key, and their efficiency, are comparable with the best-known hash-based signature schemes. Our new signature solution is stateful, and the maximum number of signatures it creates using a set of keys may be determined at key-generation time.

Figure 1:
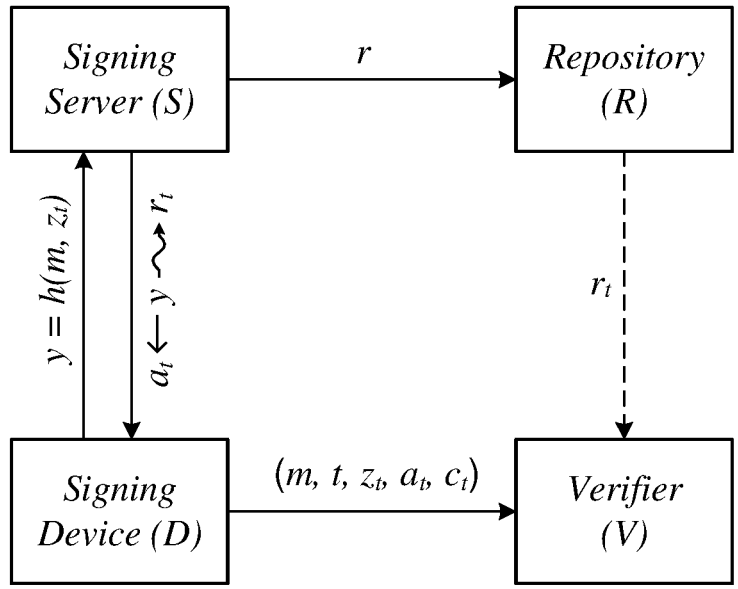
FIG. 1 illustrates the main entities in a server-assisted data-signature system in which a signer commits to a sequence of secret keys.

One hash-based arrangement—referred to as the "BLT" signature scheme—depends on interaction with a time-stamping service. FIG. 1 illustrates the main entities and components of the BLT method and system: A Signer (D), who uses trusted functionality in a secure Device, at least one signing server (S), a Repository (R), and a Verifier (V). The principal idea of the BLT signature scheme is to have the entity that wishes to sign a message (the Signer using the Device) commit to a sequence of secret keys $z_i$. Each key is assigned a time epoch, during which it can be used to sign messages ($y=h(m, z_t)$) where h is a cryptographic hash function and m is the message), and will transition from signing key to verification key once the epoch has passed. D then sends y to S, which generates and returns to D membership proof $a_t$ of the current aggregation round:

$$a_t \leftarrow y \rightsquigarrow r_t$$

In FIG. 1, the signer S thus returns $a_t$ to the device, that is, the parameters of the hash chain (illustrated as the curvy arrow) in a hash tree leading from the input y to a root value $r_t$ at time epoch t. Here, $r_t$ is the root hash of the aggregation hash tree built by the signing server S and registered in the repository R for the aggregation round t. The Signer S validates the response using the authentic $r_t$ and if validation succeeds then S outputs the tuple (m, t, $z_t$, $a_t$, $c_t$) where $c_t$ is a hash chain linking the binding of $z_t$ to a public key of S.

In order to prove timely usage of the keys, a cryptographic time-stamping service is used. It is possible to provide a suitable time-stamping service with no trust in the service provider, using hash-linking and hash-then-publish schemes.

Signing itself comprises time-stamping the message-key commitment in order to prove that the signing operation was performed at the correct time.

The BLT signature scheme thus uses one-time, time-bound keys, together with a cryptographic time-stamping service. It is post-quantum secure against known attacks and the integrity of a BLT signature does not depend on the secrecy of keys. The fact that keys have to be pre-generated for every possible signing epoch, for every signature, however, creates some implementation challenges, making, for example, on-smartcard key generation prohibitively slow in the case of real-world parameters.

In order to avoid the inherent inefficiency of pre-assigning individual keys to every time slot, keys may be spent sequentially, one-by-one, as needed. This approach is particularly useful for real-world use cases where signing is performed in infrequent batches, for example, when paying monthly bills. Sequential key use needs more elaborate support from the server; in particular, it is necessary to keep track of spent keys by both the signer and the server, and to avoid successful re-use of the spent keys. Embodiments of the invention described herein manage these keys sequentially without placing too much trust in the server.

Embodiments of this invention, which improves on the basic BLT signature scheme, should preferably have as many of the following properties as possible:

a. The number of trusted components should be kept to a minimum, including minimization of trusted storage and computation, which may be offloaded to secure hardware or to a distributed cluster;

b. Forgery should be avoided as soon as possible, that is, it is better to avoid forgery at signing time so that a signature cannot be created at all, rather than creating a signature and requiring a verifier to detect the forgery. The least desirable option is not to be able to detect forgery until some later audit;

c. The amount of globally shared data should be minimal;

d. There should be a well-defined security model, assumptions, root of trust;

e. Efficiency: many signers, few servers, single, shared root of trust;

f. Privacy by design. Even the fact that a signer has created a signature should preferably be known only to the designated verifier(s) only; and g. Easy to provide higher-level properties like non-repudiation, revocation, signing time.

Embodiments guarantee that reused one-time keys do not produce valid signatures. The previous BLT signature method summarized above employs time-bound keys, where every key can be used for signing at a specific point of time and no later. This incurs quite large overhead, however: keys must be pre-generated even for time periods when no signatures are created. For example, for a one-second time period, more than 31 million keys would have to be generated, even if needed much less frequently. In contrast, the embodiments discussed below use keys sequentially, with server-side support: every signer has a designated server, which keeps track of spent keys, together with the signer, and does not allow creation of valid signatures using already spent keys.

In one solution, the server is trusted to behave honestly. In this case, the server maintains a spent key counter that is synchronized with the signer. The server then refuses to create signatures if key indexes do not match. One drawback of this solution is lack of non-repudiation—the server can collect spent keys and create valid signatures on behalf of the signer. This situation can be improved with trusted logging and auditing.

The signer may also publish all signing events, including a key counter, in a public repository, such that the server cannot reuse keys and does not have to be treated as a trusted component. This approach will often be inefficient because of the amount of public, replicated data, which must be distributed and processed during verification; moreover, it leaks information about the signer's behavior. In this case, a public repository is similar to component often called a "ledger" in literature relating to blockchains.

Embodiments described below avoid publishing all signing transactions, while not trusting the server. As a common feature, embodiments use spent key counters both at the signer side and server side; and the server periodically creates Merkle trees on top of its counters (i) and input hashes (y); and publishes root hashes to a public repository.

Assuming no collaboration between server and verifiers, the server cannot learn keys $z_i$, and thus cannot produce valid signatures. This may be difficult to enforce in practical implementations, however—one may normally assume that signatures can be published and that the server has access to spent keys. With this restriction, a better method should eliminate the attack where the server decrements the spent key counter to i, signs a message using captured $z_i$, and then increments the counter to its previous value.

Assuming the server and (other) signers do not cooperate maliciously, one solution is "neighborhood watch": Signers observe changes in returned hash-chains and published roots and request proofs from the server that all changes were legitimate, since key counters of signers assigned to neighboring leaves were incremented only. This approach detects forgeries but does not block them. A weakness of this approach is that it fails to deal with the real possibility (or ever-present suspicion) of malicious cooperation between server and some of its clients.

The concept of authenticated data structures (see above) can be used for verifying the correct operation of the server. If the proof of correct operation is a part of signatures, then verifiers can reject signatures without valid proof and thus the server cannot forge signatures by tampering with the counters. This approach has quite large overhead: All potential verifiers must be able to validate all counters throughout their operational time. Other parties who can perform such validation are the Repository, the Signer, or an independent Auditor. Both Signer and Auditor could discover a forgery after the fact, but not this will typically not be early enough to avoid creation of forged signatures.

In an embodiment, pre-validation is done by the Repository, which may be implemented in a manner analogous to double-spending prevention performed by blockchains. In this case, Servers should provide proofs of correct operation to the trusted Repository. The Repository may then publish a root hash only after validating the correct operation of the Server(s) round. Published hashes may be made immutable using cryptographic techniques and be widely distributed. Because signatures can be verified based only on published root hash in the Repository, servers' forging of signatures by temporarily decrementing key usage counters can be eliminated. This solution is efficient: the blockchain (the amount of public data) grows only in linear relation to time; there is a relatively low number of trusted components; the blockchain, including its input validation is forward secure; the server's forgery attempt will be prevented at the signing time; and it is not necessary to have a long-term log of private data. The Repository can be implemented as a Byzantine fault tolerant distributed state machine, which eliminates the need to trust a single party. This embodiment will be described in more detail below.

Guardtime® KSI® Blockchain

Embodiments of this invention do not presuppose or require any particular form of blockchain, but a particularly advantageous form of blockchain (based on the Guardtime® infrastructure) is described below. In a preferred embodiment, the blockchain is implemented using the data signature infrastructure developed and marketed under the name KSI® by Guardtime AS of Tallinn, Estonia. This system is described in general in U.S. Pat. No. 8,719,576 (also Buldas, et al., "Document verification with distributed calendar infrastructure"). In summary, for each of a sequence of calendar periods (typically synchronized and related one-to-one with physical time units, such as one second), the Guardtime infrastructure takes digital input records as inputs, that is, lowest-level tree "leaves". These are then cryptographically hashed together in an iterative, preferably binary hash tree, ultimately yielding an uppermost hash value (a "calendar value") that encodes information in all the input records. This uppermost hash value is then entered into a "calendar". The KSI system then may return a signature in the form of a vector, including, among other data, the values of sibling nodes in the hash tree that enable recomputation of the respective calendar value if a purported copy of the corresponding original input record is in fact identical to the original input record.

For additional security, in one version of the Guardtime infrastructure, each calendar value may be mathematically combined with previous calendar values by means of a growing Merkle hash tree, whereby a top-level hash value is formed for the calendar values themselves. The Guardtime signatures returned to entities may then be extended after a number of calendar periods up through a progressively growing Merkle tree of calendar values, or a hash-chaining of calendar values, to a top-level or most recent publication value that is published in any widely witnessed manner, such as in a printed publication, an online database, in a ledger, in a blockchain, etc. It is also possible to forego the accumulation of calendar values via a Merkle tree and instead enter each calendar value into some widely witnessed data structure such as a separate blockchain-backed ledger. However, the Guardtime KSI calendar itself may thus be structured as or considered to be an append-only blockchain and may itself be sufficient even without additional hashing using a Merkle tree, without further publication, and without reliance on any other blockchain structure.

As long as it is formatted according to specification, almost any set of data, including concatenations or other combinations of multiple input parameters, may be submitted as the digital input records, which do not even have to comprise the same parameters. One advantage of the KSI system is that each calendar block, and thus each signature generated in the respective calendar time period, has an irrefutable relationship to the time the block was created. In other words, a KSI signature also acts as an irrefutable timestamp, since the signature itself encodes time to within the precision of the calendar period.

One other advantage of using a Guardtime infrastructure is that there is no need to store and maintain public/private (such as PKI) key pairs—the Guardtime system may be configured to be totally keyless except possibly for the purposes of identifying users or as temporary measures in some implementations in which calendar values are themselves combined in a Merkle tree structure for irrefutable publication. Another advantage is less apparent: Given the signature vector for a current, user-presented data record and knowledge of the hash function used in the hash tree, an entity will be able to verify (through hash computations as indicated by the signature vector) that a "candidate" record is correct even without having to access the signature/timestamping system at all.

Yet another advantage of the Guardtime infrastructure is that the digital input records that are submitted to the infrastructure for signature/timestamping do not need to be the "raw" data; rather, in most implementations, the raw data is optionally combined with any other desired input information (such as user ID, system information, various metadata, etc.) and then hashed. Given the nature of cryptographic hash functions, what gets input into the KSI system, and thus ultimately into the calendar blockchain, cannot be reconstructed from the hash, or from what is entered into the calendar blockchain.

Figure 2:
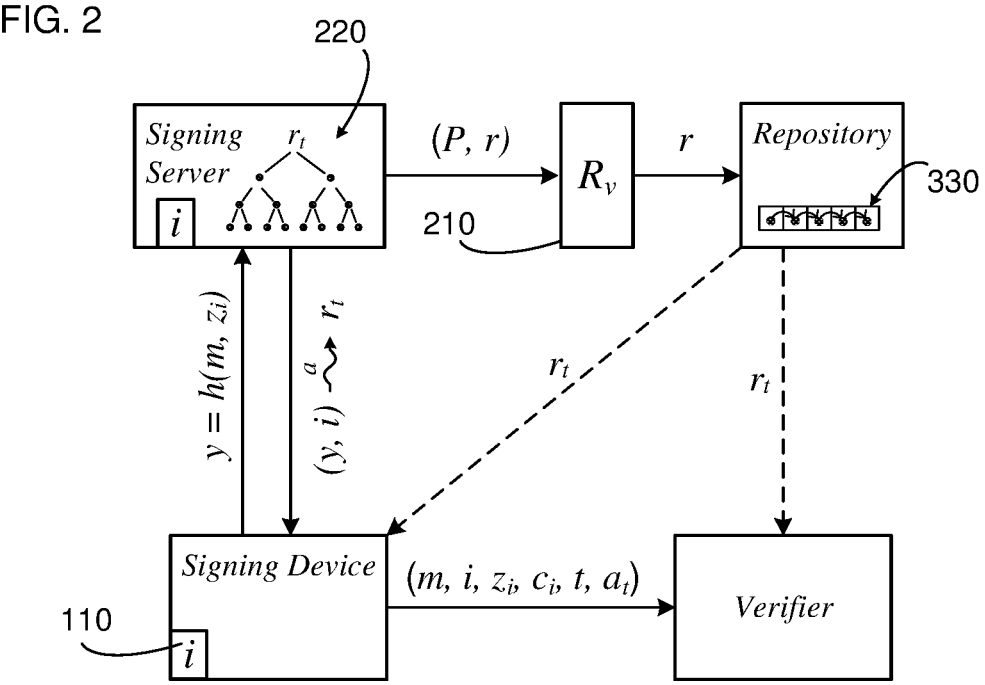
FIG. 2 illustrates the main entities in a server-assisted data-signature system in which a signing system employs an indexed hash tree.

See now FIG. 2, which illustrates the main components and information exchange between the components in embodiments of this invention:

Signer D, that is, the entity using a Device (FIG. 2), generates keys $Z_t$ and then signs a message m, which may be any body of data. The term "message" is thus used here in the known cryptographic sense. Any known mechanism may be used to distribute the keys, which may be public. The connection between D and Server S is preferably a trusted channel, implemented at another system layer using, for example, pre-distributed HMAC keys or some other known arrangement. Server S assists signers in generating signatures and keeps a counter i (data structure or element 210) of spent (that is, previously used) keys and publishes aggregate hashes (from, for example, the Guardtime KSI infrastructure) to the Repository R. The correctness of operation of S may be verified by R before publishing.

S operates in rounds (that is, hash tree aggregation intervals) and also maintains a hash tree 220, in which there is one pre-assigned leaf for every signer client, indexed by j. A hash tree leaf $l_t=(i_t; y_t)$ for round t contains the tuple of the counter value it and the current input query $y_t$ from S. S is allowed to strictly increment i and for every changed leaf it presents a Proof P of correct operation to R.

A Proof may comprise the value of the leaf in the previous round and the hash chain leading to the root of previous round, previously published by R, and the leaf value at the current round, accomplished with a hash chain to the newly computed root of current round.

The Repository R performs two tasks. First (depicted as layer $R_v$) it verifies the operation of S and after successful verification it commits the root value R to an append-only data structure, such as blockchain 330, which may be public. It is advantageous, however, to use the Guardtime signature infrastructure, described above, to implement the blockchain 330. Root values to be registered in the Repository may thereby be submitted as input values, that is, "leaves" to the Guardtime KSI infrastructure. A Guardtime signature may then be associated with each value registered. As mentioned above, this signature, leading up to a corresponding calendar value, thereby also serves as a timestamp for each entered value, that is, each value to be registered in the Repository.

Repository R then performs the following checks for each changed leaf:

$i_{t-1}+1=i_t$

All presented hash-chains are correct and consistent with each other

Remaining leaves without a proof are not changed.

If all checks pass, then R (the last, that is, most recent, block) is appended to the repository R's.

Verifier V is a relying party who verifies hash chains and signatures in any known manner, according to the manner in which they are created, typically by recomputation up to the respective root values given sibling tree values. Described above is how Guardtime KSI signatures may be verified.

Keys may be generated as follows:

In order to be able to sign N messages the Signer:

1. Generates N signing keys: $(z_1; \ldots; z_N) \leftarrow G(N; k)$, which may, for example, be unpredictable values drawn from $\{0; 1\}^k$. One option for G is any known cryptographic hash function, even the same as h, although any other hash function or other function with an sufficiently random output for a known input may be used.

2. Binds each key $z_i$ to a corresponding respective sequence number i, for example, by hashing the two:

$$x_i \leftarrow h(i; z_i) \text{ for } i \in \{1; \ldots; N\}$$

3. Computes the public key p by aggregating the key bindings into a hash tree Tree:

$$p \leftarrow \text{Tree}(x_1; \ldots; x_N).$$

Figure 3:
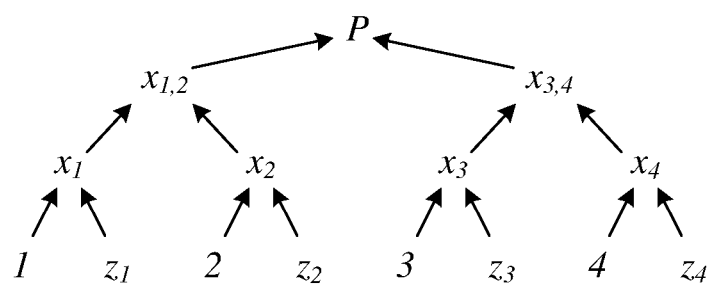
FIG. 3 illustrates a hash tree used for generating a public key.

The resulting data structure is shown in FIG. 3, which illustrates generation of the public key for N=4, and whose purpose is to be able to extract hash chains $c_i$, where $$c_i \leftarrow h(i; z_i) \leadsto p \text{ for } i \in \{1; \ldots; N\}$$

For signing, the Signer should keep its state: the sequence number of next key i (for every signer). To sign a message m the signer:

1. Uses the appropriate key $z_i$ to authenticate the message:

$$y \leftarrow h(m; z_i).$$

2. Sends y to the signing server S and receives membership proof of current aggregation round:

$$a_t \leftarrow y \leadsto r_t$$

Here, $r_t$ is the root hash of the aggregation tree built by the signing server and registered in the repository R for the aggregation round t.

3. Signer D validates the response using the authentic $r_t$.

4. If validation succeeds then signer S outputs the tuple (i; $z_i$; $c_i$; t; $a_t$), where i is the key sequence number, $z_i$ is the i-th signing key, $c_i$ is the hash chain linking the binding of $z_i$ and its sequence number i to the signer's public key p and $a_t$ is the hash chain returned by signing server for round t, linking (i; y) to $r_t$.

5. Signer D increments a spent key counter 110:

$$i \leftarrow i+1.$$

The server S, upon receiving request y, performs the following steps:

1. Collects requests from other clients until the end of the t-th aggregation round, 2. Updates leaves for every client that has made a query:

$$i \leftarrow i+1; l \leftarrow (i; y)$$

3. Computes a Merkle tree root $r_t$,

4. Submits $r_t$ to repository R together with validity proof of every changed leaf:

$$l_{t-1} \leadsto r_{t-1}, l_t \leadsto r_t$$

5. Upon receiving confirmation that $r_t$ is registered in the blockchain 330 (or other append-only data structure) in or accessible by the Repository, returns hash chains to every client with a pending query:

$$a_t \leftarrow l \leadsto r_t$$

Note that the signature is composed and sent to verifier V only after the verification of $r_t$, which makes it safe for the signer to release the key $z_i$ as part of the signature—the server has incremented its counter i 210 so that only $z_{i+1}$ could be used to produce the next valid signature.

The blockchain (one example of which is the Guardtime calendar), performs following operations:

1. Verifies the validity of every change in the server's hash tree. If a sibling hash in any hash chain has changed, then there must be a proof showing that this change was caused by a valid change of a leaf. Key indexes were only incremented;

2. Maintains cryptographic links between roots; and

3. Makes roots available.

To verify that the message m and the signature S=(i; z; c; t; a) match the public key p, the verifier:

1. Checks that $z_i$ matches the public key:

$$h(i; z) \stackrel{c}{\leadsto} p$$

2. Checks that in was authenticated with key z at the proper time $$t: h(i'; h(m,z)) \stackrel{a}{\leadsto} r_t$$

3. Checks if key index matches server counter: i=i'

4. Checks if $r_t$ is present in the blockchain for round t.

Figure 4:
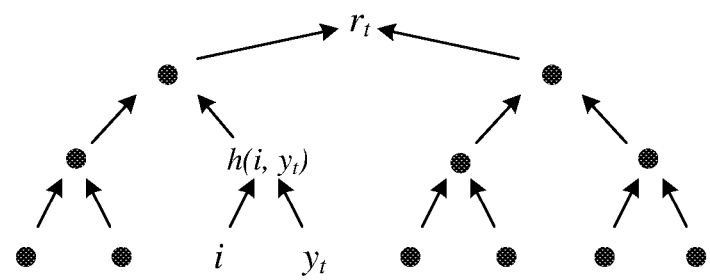
FIG. 4 illustrates a server tree with a key counter.

For proof of correct operation, the Server may maintain an internal Merkle tree, in which every client (Signer) has a pre-assigned leaf position; its request hash (y) and counter value (i) are located in this particular position. The server works in rounds. When a round is complete then a final Merkle tree may be built, its root submitted to the Repository and, for each client, a respective hash chain (a) is returned. FIG. 4 illustrates a Server tree for a t-th round, depicting key counter i and input $y_t$ of the 2nd client.

The proof of correct operation can be constructed either iteratively, by generating hash chains before and after each leaf change, or in batches, taking hash chains before a round, applying all changes to hash tree leaves, generating the final Merkle tree, and then generating "after"-hash chains for each changed leaf. An iterative approach has the advantage that it is not necessary to perform explicit consistency and completeness checks between each leaf's chain.

Denote the sequence of indexes of leaf positions of clients who have provided a request during a particular round as $\mathcal{J}$. Proof $\mathcal{P}_c$ of correct operation of the round c may be defined as sequence $$\mathcal{P}_c = ((i^j_c - 1, y^j_c - 1), a^j_{c,v}, (i^j_c, y^j_c); j = \mathcal{J}_v, V = (1 \ldots |\mathcal{J}|)$$

where $i^j_c$ is the j-th leaf of the server hash tree and $a^j_{c,v}$ is information necessary to compute the hash-chain from the leaf to the root. For the computation of a the server tree may be updated every time a leaf is changed (denoted by incrementing the in-round change counter v). The content of $a^j$ does not change when j-th leaf changes because the rest of the leaves are still the same; this fact allows verification of the completeness of $\mathcal{J}$ and consistency of its elements by just verifying hash chains in the provided sequence, and checking that the "after"-root is the same as the "before"-root of the following leaf change, checking the correctness and matching roots of hash chains when computed in the same order.

One example of a verification routine for $\mathcal{P}$ referred to as Oracle Ra, is described by the following pseudo-code, in which the subscript v indicates the respective values during verification:

Oracle $R_a$ (approval)
  Query Put ($\mathcal{P}$, r')
    g←$r_c$
    for ($i_{v-1}$, $y_{v-1}$, $i_v$, $y_v$, $a_v$) in $\mathcal{P}$
      if $i_{v-1} \neq i_{v-1}$ then:
        return⊥
      if $g \neq R((i_{v-1}, y_{v-1}), a_v)$ then:
        return⊥
      $g = R((i_{v-1}, y_{v-1}), a_v)$
    if $g \neq r'$ then:
      return⊥
    R,Put(r')

Here, the symbol "⊥", as is common, indicates "invalid result", and function R( ) computes the Merkle tree root based on a leaf and a hash chain, so that:

$$\text{if } l \leadsto r, \text{ then } r = R(l, a)$$

The various components of the system, in particular, the Signer/Device D, the server(s) S, the Repository R, and the Verifier V may all have a conventional computer hardware structure, with at least one processor, system software, applications running on the hardware via the system software, and both volatile and non-volatile storage components to perform memory and more static storage functions. The term "server(s)" it not to be taken as limited to the somewhat larger computer system often referred to as a "server", for example, in network systems, but may be any computing system with enough processing power and storage capacity to "serve" requests for signatures using embodiments of the invention. The various operations described above for performing the different routines of the functions of the different components may thereby be implemented as processor-executable code configured to carry out those operations. Components that include such data structures as a blockchain may then implement these structures in their respective storage components.

One advantage of the embodiments of the invention, however, is that the signature methods described for the different embodiments are efficient enough that the Signer/Device may typically (but need not be) be smaller, with less computational power and/or storage capacity, than general-purpose computers such as laptops, network servers, etc., for example, the Signer/Device D could be a tablet computer, smart phone, or other smart device configured to request signatures for data.

The components such as the signing Server S and the Repository R are shown as being separate in the Figures. This may not be necessary in all implementations; rather, S and R could be implemented within the same computing system. Such a combination may require greater trust in the server S, but in many cases this may be acceptable. Moreover, if the Guardtime infrastructure is used to implement the blockchain 330 and possibly even for other signature generation, its greater security as compares with a conventional blockchain, especially if such a conventional blockchain is stored locally within R, may mitigate any reduction of trust caused.

What is claimed is:

1. A method for digitally securing data comprising:
generating a plurality of pre-generated keys as a set of unpredictable digital values;
from at least one signing entity via a respective device, receiving at a signing server a query for a signature of a message said request comprising a randomizing function of the message and a current key, said key being one of a plurality of the pre-generated keys;
maintaining a counter of ones of the pre-generated keys previously used by the signing entity;
maintaining a hash tree data structure having a plurality of input leaves and a root value;
during each of a series of rounds, including a current round, associating with the signing entity a respective one of the input leaves of the hash tree, each round corresponding to an aggregation interval;
returning to the signing entity parameters of a first hash chain corresponding to a path through the hash tree from a hash of the query and a current counter value up to the root value of the hash tree for the round during which the request is received;
submitting the root value for registration in a repository and receiving confirmation of registration; and
incrementing the counter associated with the signing entity, whereby the current key is made unusable for signing in subsequent rounds;
computing mathematical key bindings of each pre-generated key to a respective sequence number;
computing a public key by aggregating the key bindings into a public key hash tree;
associating respective second hash chains with the pre-generated keys, each said second hash chain defining a computation path from the respective pre-generated key to the public key;
generating a signature of the message, said signature comprising the current counter value, the current key, the respective second hash chain, an identifier of the respective round, and the respective first hash chain; and incrementing a spent key counter within the signing entity.

2. The method of claim 1, further comprising performing the steps of claim 1 for each of a plurality of the signing entities and queries during the same current round.

3. The method of claim 2, further comprising, for each signing entity that has submitted a query during the current round, updating the corresponding leaf of the hash tree to include the respective incremented counter.

4. The method of claim 1, further comprising registering each root value as an entry in an append-only data structure in the repository.

5. The method of claim 4, in which the append-only data structure is a blockchain.

6. The method of claim 4, in which the append-only data structure is a signature and timestamping hash tree infrastructure into which each root value is inputted as a digital input record, said digital signature including values enabling recomputation from a function of each respective root value upward through the signature and timestamping hash tree infrastructure to a calendar value corresponding to a calendar period, whereby said digital signature encodes the calendar period and forms a timestamp for each inputted root value.

7. The method of claim 1, further comprising:
verifying correct operation of the signing server before registering the root value in the repository, and
if the correct operation of the signing server is verified, returning to the signing server confirmation of registration.

* * * * *